United States Patent [19]

Alexander

[11] Patent Number: 5,141,277
[45] Date of Patent: Aug. 25, 1992

[54] STAKE POCKET INSERT

[76] Inventor: Harry Alexander, Rte. 1, Box 2, Reardan, Wash. 99029

[21] Appl. No.: 706,960

[22] Filed: May 29, 1991

Related U.S. Application Data

[63] Continuation-in-part of Ser. No. 534,759, Jun. 7, 1990, abandoned.

[51] Int. Cl.⁵ .............................................. B60P 7/06
[52] U.S. Cl. ..................................... 296/43; 410/101; 410/110
[58] Field of Search ................... 296/43; 410/101, 102, 410/106, 107, 108, 109, 110

[56] References Cited

U.S. PATENT DOCUMENTS

| | | | |
|---|---|---|---|
| 3,259,353 | 7/1966 | Webb | 296/43 X |
| 3,351,356 | 11/1967 | Clark et al. | 410/110 |
| 3,421,726 | 1/1969 | Getter | 410/110 |
| 3,455,573 | 7/1969 | Magers | 296/43 X |
| 3,595,125 | 7/1971 | Jacobs | 296/43 X |
| 3,623,690 | 11/1971 | Bargmen, Jr. | 296/43 X |
| 3,674,304 | 7/1972 | Swanson | 296/43 |
| 3,841,695 | 10/1974 | Woodward | 296/43 |
| 3,950,010 | 4/1976 | Robertson | 410/110 |
| 4,042,275 | 8/1977 | Glassmeyer et al. | 296/43 |
| 4,191,108 | 3/1980 | Jones | 410/110 |
| 4,316,688 | 2/1982 | Roskelly | 410/107 X |
| 4,531,774 | 7/1985 | Whatley | 410/101 X |
| 4,607,991 | 8/1986 | Porter | 410/110 |
| 4,657,299 | 4/1987 | Mahan | 296/43 X |
| 4,760,986 | 8/1988 | Harrison | 410/110 X |
| 4,762,449 | 8/1988 | St. Pierre et al. | 410/107 |
| 4,812,093 | 3/1989 | Millar, Jr. | 410/110 |
| 4,815,787 | 3/1989 | Hale | 296/43 X |
| 4,850,770 | 7/1989 | Millar, Jr. | 410/110 |
| 4,915,556 | 4/1990 | Unger | 410/110 |
| 4,948,311 | 8/1990 | St. Pierre et al. | 410/107 |
| 5,051,047 | 9/1991 | Loncarie | 410/110 X |

*Primary Examiner*—Robert J. Spar
*Assistant Examiner*—Robert S. Katz
*Attorney, Agent, or Firm*—Wells, St. John & Roberts

[57] ABSTRACT

A stake pocket insert includes a stake receiver and a clamp element designed to engage the interior of a conventional vehicle cargo bed stake pocket. The stake receiver has a cover plate that can be used to anchor a bed liner. The clamp element includes a bracket that engages the interior of the stake pocket and a protruding bolt that can also provide a tie down anchor.

13 Claims, 2 Drawing Sheets

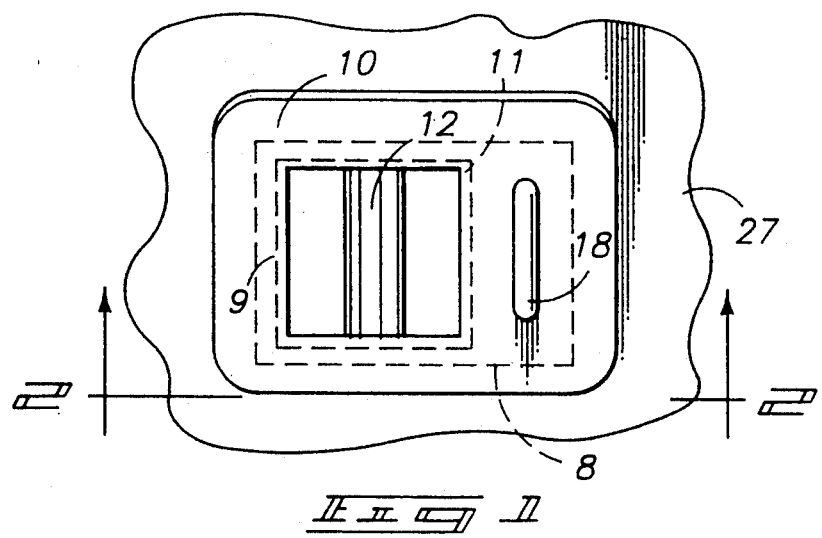
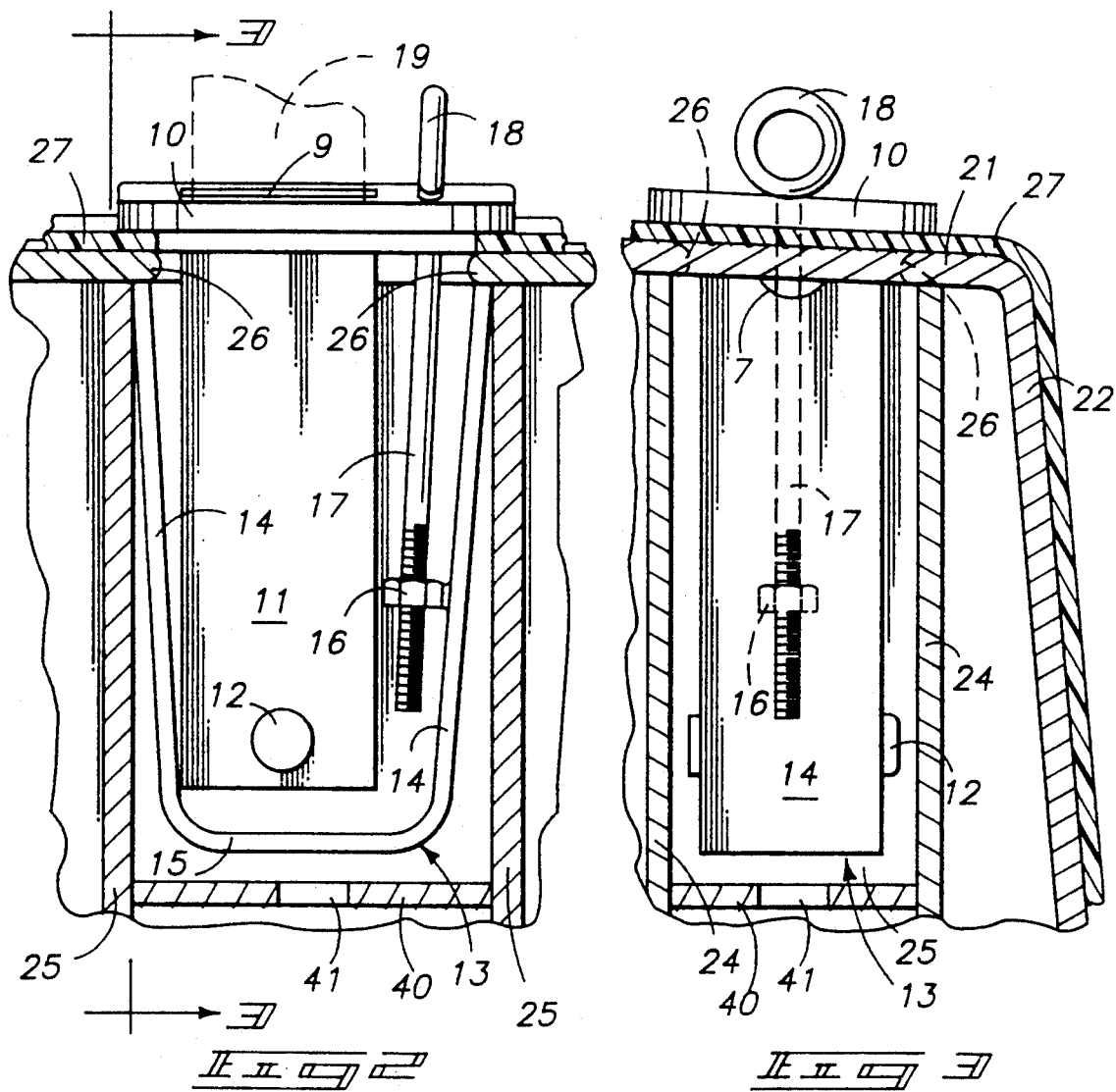

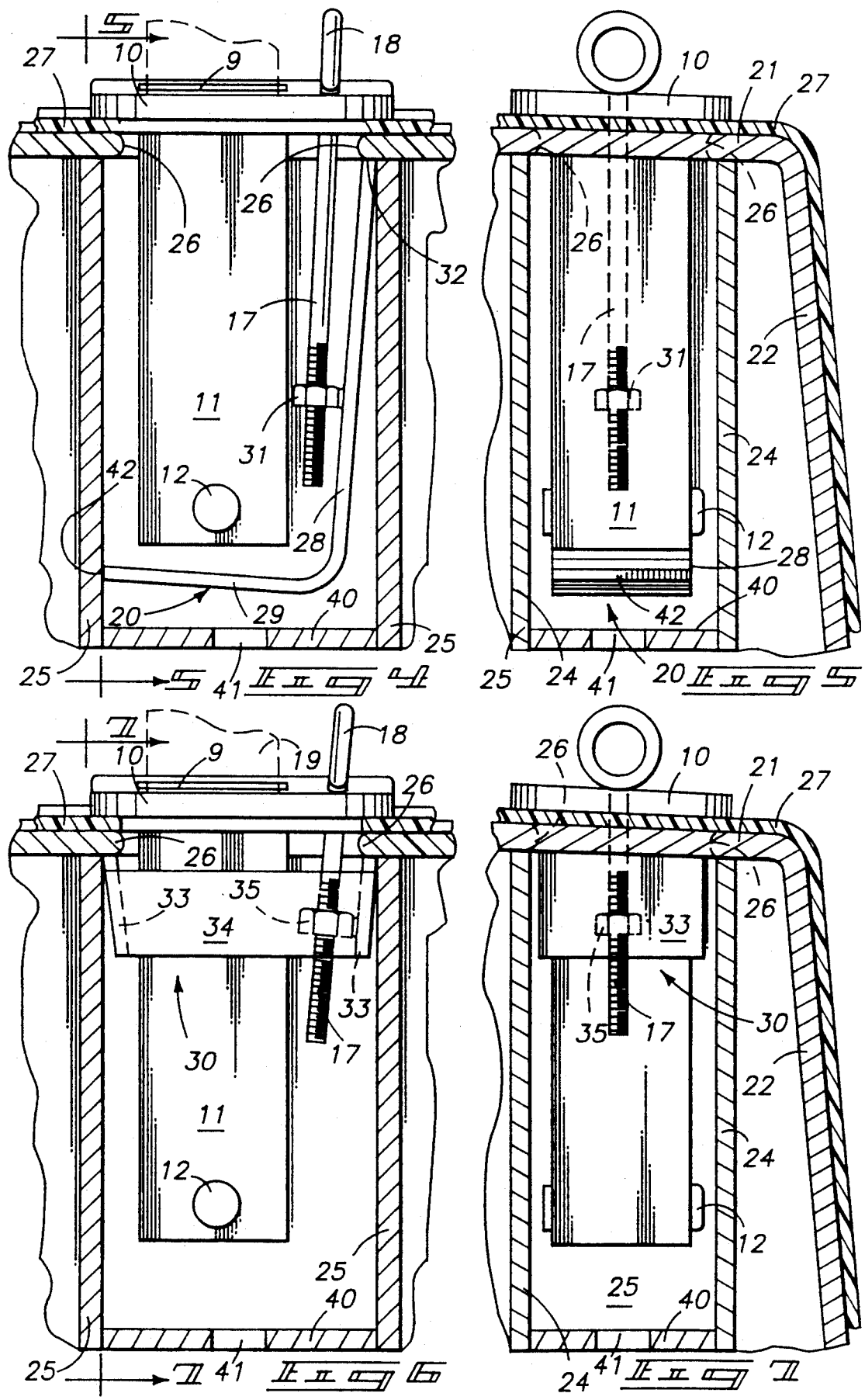

STAKE POCKET INSERT

RELATED APPLICATION

This is a continuation-in-part of copending U.S. patent application Ser. No. 534,759, filed Jun. 7, 1990 and titled "Stake Pocket Insert", now abandoned.

TECHNICAL FIELD

The present invention relates to vehicle cargo bed side wall accessories, and specifically to an auxiliary stake receiver designed to clamp a bed liner to the vehicle cargo bed side wall at each stake pocket. The accessory also provides an accessible opening for a removable stake or post, plus a tie down anchor.

BACKGROUND OF THE INVENTION

It is common to use tie downs and stakes about the bed of a pickup truck or other vehicle for securing a load contained within it. The tie downs are usually located at the perimeter of the truck bed to provide anchorage for lines, cables or ropes. Stakes are used to increase the height of the side walls and to carry supports for specialized loads.

It is also common today to utilize a plastic bed liner to protect surfaces within the cargo bed. Conventional bed liners extend upwardly and partially cover the side walls of the cargo bed. They often overlap and cover the conventional stake openings provided on such vehicles. Because the stake openings vary in size and location, the manufacturers of bed liners have found it to be impractical to make provision for complementary openings in the bed liners.

The sides of the bed liner are normally not secured to the side walls of the vehicle. They are subject to warping and flapping in the wind that results from vehicle movement.

The present invention is designed to clamp the bed liner to the side walls of the vehicle cargo bed and to provide an accessory stake receiver without modification of the stake pockets. Furthermore, the clamp mechanism used to secure the stake receiver to the vehicle also provides outer eyes that can be used as tie down anchors. The accessory stake pocket insert reinstates the functions of the stake pockets that are typically covered by a bed liner.

BRIEF DESCRIPTION OF THE DRAWINGS

The preferred embodiment of the invention is illustrated in the accompanying drawings, in which:

FIG. 1 is a top view of a stake pocket insert;

FIG. 2 is a side sectional view through a stake pocket insert as seen along ling 2—2 in FIG. 1;

FIG. 3 is a sectional view as seen along line 3—3 in FIG. 1;

FIG. 4 is a view similar to FIG. 2, showing a second clamp embodiment;

FIG. 5 is a sectional view taken along line 5—5 in FIG. 4;

FIG. 6 is a view similar to FIG. 2, showing a third clamp embodiment; and

FIG. 7 is a sectional view taken along lines 7—7 in FIG. 6.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

The drawings illustrate details of three embodiments of a stake pocket insert for use in conjunction with a vehicle cargo bed side wall having an upper surface interrupted by a stake opening. The side wall structure includes a top wall 21 presenting an upwardly-facing surface including a conventional stake opening illustrated by dashed line 8 in FIG. 1. Such rectangular stake openings are typically provided at the sides of smaller utility truck beds or pickup trucks.

The side wall structure along each side of the truck bed also includes a side wall 22 leading to top wall 21. The conventional stake receiver located within each stake opening 8 is bounded by parallel side walls 24 (FIG. 3) and parallel end walls (FIG. 2). The walls 24, 25 form an upright rectangular pocket for a conventional rectangular stake (not shown) inserted through the opening 8.

The edges of top wall 21 about the stake opening typically present small ledges 26 that protrude slightly beyond the inside surfaces of walls 24 and 25. The stake pockets also normally include a horizontal bottom wall 40 having an opening 41 for drainage purposes.

A conventional bed liner 27 is shown in the drawings. The liner comprises a molded plastic sheet configured to complement the shape of the bed and side wall in the truck. Such liners are normally constructed with no apertures providing access to the conventional stake openings in the side wall. To accommodate the present insert, the conventional liner 27 must be apertured at each stake opening location, the size of each aperture in liner 27 being identical to the size of the stake opening 8. Each aperture in the liner 27 must be located coincident with a corresponding stake opening 8 to provide open access to it.

The stake pocket insert essentially comprises two elements. The first element is a stake receiver designed to provide support for a smaller cross-sectional stake or post, illustrated at 19 in FIGS. 2, 4, and 6. The stake receiver includes a cover plate 10 and a depending tube 11. The second element is a clamp means for securing the stake receiver within the stake pocket. The clamp means includes a rigid bracket 13, 20 or 30 threadably connected to a bolt 17 having an enlarged end, shown as a closed eye 18. The clamp means locks the stake receiver into place within the stake pocket without modification of the stake pocket.

Not only does the stake receiver provide support for a complementary post or stake 19, but it can also provide an optional tie-down anchor at bolt eye 18 for attachment by cables or ropes. The cover plate 10 overlaps the ends and sides of the conventional stake opening 8. This overlapping relationship can be used to secure a bed liner 27 to the upper surface of the top wall 21 of the side wall structure for the truck bed. These functions will be more evident from the following detailed description.

The stake receiver is identical in each of the three illustrated embodiments of this assembly. The rectangular cover plate 10 has sufficient length and width to clamp an apertured bed liner between the periphery of the plate and the upwardly-facing surface of the vehicle cargo bed side wall on which the bed liner is supported. When no bed liner is being used, the cover plate 10 will directly abut the upper surface of the side wall surrounding the stake opening 8.

Hollow tube 11 is fixed to one side of cover plate 10. Tube 11 extends outwardly from the plate 10 for insertion into a stake opening 8. The outer (lower) end of tube 11 is partially obstructed by a transverse rod or tube that serves as a stop 12 for limiting entry of a stake 19 into the interior of tube 11.

The cover plate 10 has an open aperture 9 formed through it coincident with the interior walls of tube 11. The aperture 9 and interior walls of tube 11 form an upwardly-open guide for reception of a complementary post or stake 19 through the aperture 9. Cover plate 10 also includes an open aperture adapted to loosely receive the shank of bolt 17.

The three embodiments differ from one another with respect to the details of the illustrated brackets included within the clamp means for securing the stake receiver within a conventional stake pocket of a truck bed. While three forms of the brackets are shown, it is evident that additional bracket details are possible as substitutions for those detailed herein.

The clamp means is located at the one side of cover plate 10. It is positioned alongside the exterior of tube 11 for selectively locking the stake receiver within the stake opening 8 with the cover plate 10 overlying the top wall 21 of the vehicle cargo bed side wall and with the hollow tube 11 positioned within the stake opening 8.

In each form of the invention, the bolt 17 of the clamp means extends through an opening in the cover plate 10 that is offset to one side of the aperture 9. This provides exterior access to the clamp means at a location above the cover plate 10 for tightening a bracket within the stake pocket to anchor the stake receiver in place or loosening the bracket to facilitate removal of the accessory. Each bolt 17 further includes an enlargement, such as eye 18, abutting the cover plate 10 at its remaining side opposite to the hollow tube 11.

The width of each clamp bracket is slightly less than the width across the stake opening 8. This size relationship permits the bracket to pass through the opening while loosely connected to the threaded shank of bolt 17. When necessary, access is also available below the bracket by use of a screwdriver or other hand-held tool protruding upwardly through the opening 41 in the bottom wall 40 of the stake pocket.

The first embodiment of the clamp means, shown in FIGS. 1-3, comprises a U-shaped bracket 13. Bracket 13 includes two extended upright legs 14 and a connecting transverse base 15. The legs 14 and base 15 are bent from a single sheet of metal with the outer (upper) ends of legs 14 sprung slightly apart. Legs 14 have substantially equal lengths which are greater than the length of tube 11. They are sprung outwardly apart at their open ends for engagement under inwardly projecting ledges 26 at the top of a stake opening within which they are used. The two legs 14 straddle the exterior of hollow tube 11 to engage the interior of the vehicle stake opening at their respective top edges. The top edges of clamp legs 14 are notched at 7 for engagement with a screwdriver (not shown) or other tool used to assist in prying the legs 14 toward one another to clear the ledges 26 during removal of the clamp from a stake pocket.

Bracket 13 is held in place within the stake opening by an elongated upright bolt 17 having a threaded shank that extends loosely through a complementary opening in cover plate 10 and terminates at an enlarged end or eye 18. In the preferred embodiment, the enlarged end 18 on bolt 17 is an enlarged open eye abutting the cover plate 10 at its exterior, but other head configurations can be provided on bolt 17 as required.

The inner end of the bolt 17 is adjustably received within a threaded receiver 16 attached to one leg 14 of bracket 13. It is shown positioned between the leg 14 and tube 11. By turning the enlarged end 18 on the bolt, one can pull the bracket upwardly toward cover plate 10 or allow it to drop and move apart from the cover plate.

The embodiment shown in FIGS. 1-3 provides an open recess for support of an upright stake 19 or post that fits within the tube 11 and rests on the stop 12. It also provides an eye bolt that can serve as a fixed anchor for ropes, cables, etc. used in conjunction with the vehicle to tie down a load. Furthermore, the cover plate 10 can effectively clamp a bed liner 27 to the vehicle cargo bed side wall for securing the bed liner in place along the top surfaces of the side walls of a truck bed.

To place the stake pocket insert within a receiving stake pocket, one first loosely mounts the bracket 13 to the cover plate 10 by adjustment of the bolt 17. The clamp bracket 13 can then be forced downwardly through the stake opening 8 until the upper edges of bracket 13 have cleared the ledges 26 and spring outwardly under them. Bolt 17 can then be tightened to draw the upper edges of bracket 13 tightly against the ledges 26.

Removal of the stake pocket insert requires a reversal of the above-described steps. First the bolt 17 is loosened and pushed downwardly to lower the bracket 13 within the stake pocket. Next, the upper end of each leg 14 can be sprung inwardly and pulled upwardly through the stake opening 8 in sequence, using a screwdriver or pry tool and the attached bolt 17 to manipulate the bracket 13.

FIGS. 4, 5 and 6, 7 illustrate second and third embodiments of the clamp means, respectively. The previously-described reference numerals are used in both instances to identify those elements of the stake receiver common to the three forms of the invention.

In FIGS. 4 and 5, bracket 20 is L-shaped. It has an extended leg 28 positioned alongside the hollow tube 11 in the same manner as were legs 14 of the first embodiment. Leg 28 also intersects a transverse base 29 extending across the outer end of tube 11.

A threaded receiver 31 is fixed to the inner surface of leg 28 with its axis parallel to the side edges of leg 28. As the interconnecting bolt is tightened against the cover plate 10, the top edge 32 of leg 28 will draw the outer edge of base 29 toward one end wall 25 of the receiving stake pocket. This will cause the edge across base 29 to frictionally engage and wedge against the inside surface of the end wall, as shown in FIG. 4, locking the bracket 20 in place. The loose reception of the elongated shank of bolt 17 accommodates this tilting motion of the bracket 20 necessary for clamping purposes. The weight of bracket 20 will return it to a released position when bolt tension is subsequently relaxed. It can then be pulled upwardly through the stake opening 8 by the loosened bolt 17.

In FIGS. 6 and 7 the bracket 30 is a loop-shaped bracket encircling the hollow tube 11 and having spaced legs 33 flaring outwardly from the parallel walls of the exterior of tube 11. Legs 33 are joined by connecting side walls 34 to complete the looped bracket. A threaded receiver 35 is provided at the inside of one leg 33 for reception of the threaded bolt shank 17. As the bolt is tightened against cover plate 10, the inner ends of legs 33 will come into engagement with the vehicle cargo bed side wall under the previously-described ledges 26. This form of bracket is inserted into and removed from the stake pocket by inclining it relative to a horizontal position while it is loosely suspended along the shank of bolt 17.

In those instances where tie downs are not required, a substitute bolt having a conventional transverse enlarged head can be used in place of the illustrated eye bolt. The stake receiver provides substantial versatility in its construction and utility.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A stake pocket insert for use in conjunction with a vehicle cargo bed side wall having a substantially horizontal surface interrupted by a stake opening, comprising:
   a stake receiver including a cover plate whose peripheral edges are adapted to overlap the periphery of a stake opening of a vehicle cargo bed side wall and a hollow tube having interior walls extending perpendicularly from one side of the cover plate for insertion into the stake opening, the cover plate having an open aperture formed through it coincident with the interior walls of the tube for reception of a complementary post or stake through the cover plate aperture; and
   clamp means located at the one side of the cover plate, the clamp means being positioned alongside the exterior of the tube for selectively locking the stake receiver within a stake opening with the cover plate overlying the stake opening and the hollow tube being positioned within it;
   the clamp means extending through an opening in the cover plate offset to one side of the open aperture.

2. The stake pocket insert of claim 1, wherein the clamp means further includes an enlargement abutting the cover plate at its side opposite to the hollow tube.

3. The stake pocket insert of claim 1, wherein the clamp means further includes an enlarged open eye abutting the cover plate at its side opposite to the hollow tube.

4. The stake pocket insert of claim 1, wherein the clamp means includes:
   a bracket having an extended leg positioned alongside the hollow tube and interconnected to an intersecting a base extending across the outer end of the tube; and
   a bolt having a shank loosely received through a complementary opening in the cover plate, one end of the bolt being enlarged and in engagement with the remaining side of the cover plate, the remaining end of the bolt being threadably connected to the bracket.

5. The stake pocket insert of claim 1, wherein the clamp means includes:
   a bracket having an extended leg positioned alongside the hollow tube and interconnected to an intersecting a base extending across the outer end of the tube; and
   a bolt having a shank loosely received through a complementary opening in the cover plate, one end of the bolt being enlarged and in engagement with the remaining side of the cover plate, the remaining end of the bolt being threadably connected to the bracket;
   one edge of the base being adapted to engage a wall of a stake pocket as the bolt draws the base toward the cover plate with an inner end of the leg engaged under a projecting ledge across the top of a stake opening.

6. The stake pocket insert of claim 1, wherein the clamp means includes:
   a U-shaped bracket having two legs straddling the hollow tube and interconnected by a base; and
   a bolt having a shank loosely received through a complementary opening in the cover plate, one end of the bolt being enlarged and in engagement with the remaining side of the cover plate, the remaining end of the bolt being threadably connected to the bracket.

7. The stake pocket insert of claim 1, wherein the clamp means includes:
   a U-shaped bracket having two legs straddling the hollow tube and interconnected by a base, the two legs having substantially equal lengths that are each greater than the length of the tube, the two legs being sprung outwardly apart at their open ends for engagement under projecting ledges across the top of a stake opening; and
   a bolt having a shank loosely received through a complementary opening in the cover plate, one end of the bolt being enlarged and in engagement with the remaining side of the cover plate, the remaining end of the bolt being threadably connected to the bracket.

8. The stake pocket insert of claim 1, wherein the clamp means includes:
   a U-shaped bracket having two legs straddling the hollow tube and interconnected by a base; and
   a bolt having a shank loosely received through a complementary opening in the cover plate, one end of the bolt being enlarged and including an open eye protruding outwardly from the cover plate opposite to the hollow tube, the eye being in engagement with the remaining side of the cover plate, and the remaining end of the bolt being threadably connected to the bracket.

9. The stake pocket insert of claim 1, wherein the clamp means includes:
   a loop-shaped bracket encircling the hollow tube and having spaced legs flaring outwardly from the tube exterior; and
   a bolt having a shank loosely received through a complementary opening in the cover plate, one end of the bolt being enlarged and in engagement with the remaining side of the cover plate, the remaining end of the bolt being threadably connected to the bracket.

10. A stake pocket insert for use in conjunction with a vehicle cargo bed side wall having an upwardly-facing surface interrupted by a stake opening, comprising:
    a stake receiver including a cover plate of solid material, the peripheral edges of the cover plate being adapted to overlap the periphery of a stake opening of a vehicle cargo bed side wall;

the stake receiver further including a hollow tube adapted to be inserted into a stake opening covered by the cover plate, the hollow tube having interior walls extending perpendicularly from one side of the cover plate;

the cover plate of the stake receiver having an open aperture formed through it coincident with the interior walls of the tube for reception of a complementary post or stake through the cover plate aperture;

a movable clamp element at the one side of the cover plate, the clamp element being positioned alongside the exterior of the tube for selectively engaging inner wall surfaces of a stake opening with the covering cover plate overlying its horizontal section and the hollow tube being positioned within it; and a bolt having a shank loosely received through a complementary opening in the cover plate, one end of the bolt being enlarged and in engagement with the remaining side of the cover plate, the remaining end of the bolt being threadably connected to the movable clamp element for selectively urging the cover plate toward the horizontal section of a vehicle cargo bed side wall in response to tightening of the bolt.

11. The stake pocket insert of claim 11, wherein the cover plate has a rectangular shape having sufficient length and width to clamp an apertured bed liner between the periphery of the cover plate and the horizontal section of a vehicle cargo bed side wall in response to tightening of the bolt.

12. The stake pocket insert of claim 11, wherein the one end of the bolt includes a bent eye protruding outwardly from the cover plate opposite to the hollow tube.

13. The stake pocket insert of claim 11, wherein the cross-sectional configuration of the interior walls of the tube is square.

* * * * *